United States Patent [19]

Yoshimoto et al.

[11] Patent Number: 4,811,021

[45] Date of Patent: Mar. 7, 1989

[54] DUAL POLARIZATION TRANSMISSION SYSTEM

[75] Inventors: Makoto Yoshimoto; Shigeki Maeda, both of Tokyo, Japan

[73] Assignee: NEC Corporation, Tokyo, Japan

[21] Appl. No.: 207,985

[22] Filed: Jun. 17, 1988

[30] Foreign Application Priority Data

Jun. 17, 1987 [JP] Japan ................................ 62-151816

[51] Int. Cl.[4] ........................ H04B 7/10; H01Q 21/06; H04J 1/12
[52] U.S. Cl. ...................................... 342/361; 455/63; 370/6; 370/78
[58] Field of Search ................ 342/361, 188, 362–364; 375/22, 23, 24, 100; 455/63, 266, 295, 296; 370/6, 29, 20, 78

[56] References Cited

U.S. PATENT DOCUMENTS 3,742,149 6/1973 Yoshida et al. ....................... 455/63

Primary Examiner—Theodore M. Blum
Assistant Examiner—Gregory C. Issing
Attorney, Agent, or Firm—Sughrue, Mion, Zinn, Macpeak, and Seas

[57] ABSTRACT

A dual polarization transmission system includes a first circuit for alternately arranging a plurality of channels having a first bandwidth on a first polarized wave and a second polarized wave orthogonal to the first polarized wave on a frequency axis, and a second circuit for alternately arranging a plurality of channels having a second bandwidth smaller than the first bandwidth on the opposite polarized wave having the same center frequency as that of a corresponding one of the channels arranged by the first circuit.

7 Claims, 6 Drawing Sheets

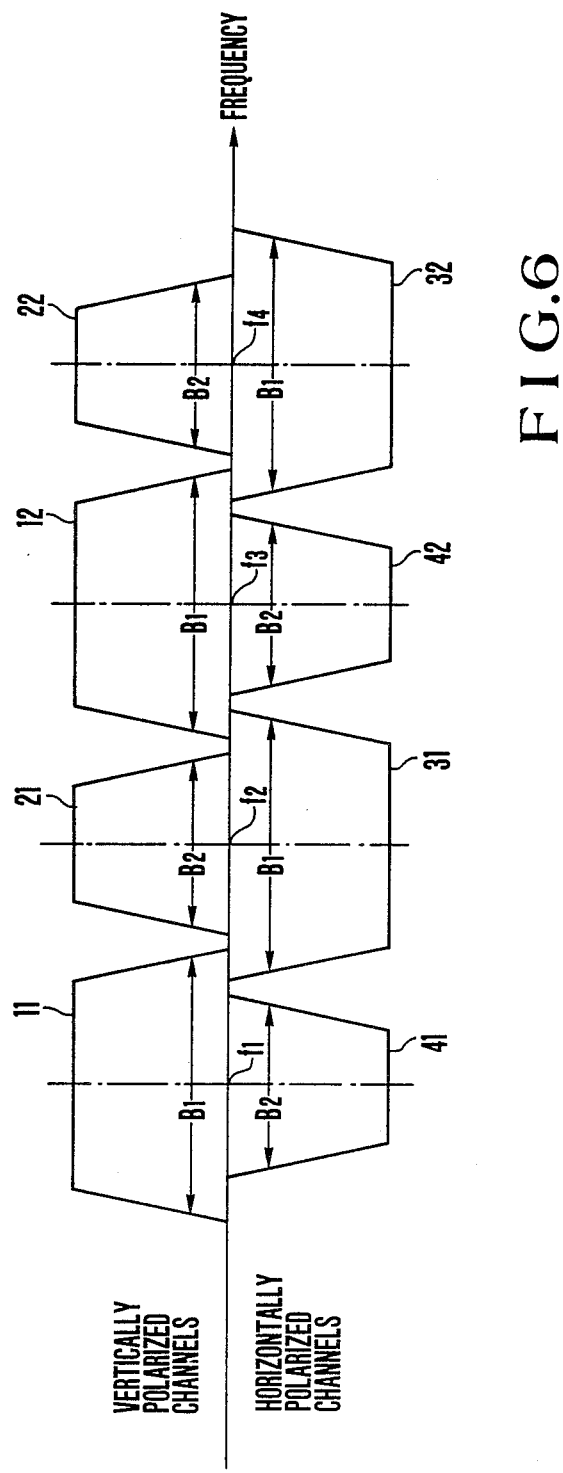

DUAL POLARIZATION TRANSMISSION SYSTEM

BACKGROUND OF THE INVENTION

The present invention relates to a dual polarization transmission system and, more particularly, to a dual polarization transmission system in which channels having the same center frequency are arranged on two orthogonal polarized waves in a digital radio communication system.

In order to increase a channel capacity in a digital radio communication system having a large number of channels, an interleave frequency arrangement in which channels are alternately arranged on two orthogonal polarized waves, e.g., a vertically polarized wave and a horizontally polarized wave has been widely used.

FIG. 1 shows an arrangement of a conventional system for realizing an interleave frequency arrangement, and FIG. 2 shows the interleave frequency arrangement.

In FIG. 1, a transmitter side is constituted by 16 QAM modulators 111, 112, 131, and 132 for outputting 16 QAM modulated signals (IF signals) having a bandwidth B1, transmitters 211, 212, 231, and 232 for converting the 16 QAM modulated signals into signals of radio frequencies having center frequencies f1, f3, f2, and f4 and outputting the obtained signals, and a transmitting antenna 101. Outputs from the transmitters 211 and 212 are connected to a vertical polarization side of the transmitting antenna 101 and transmitted as vertically polarized channels 11 and 12 having the center frequencies f1 and f3 and the bandwidth B1. Outputs from the transmitters 231 and 232 are connected to a horizontal polarization side of the transmitting antenna 101 and transmitted as horizontally polarized channels 31 and 32 having the center frequencies f2 and f4 and the bandwidth B1. As a result, the interleave frequency arrangement shown in FIG. 2 is realized.

A receiving side is constituted by receivers 311, 312, 331, and 332 and 16 QAM demodulators 411, 412, 431, and 432. A vertical polarization side of a receiving antenna 102 is connected to the receivers 311 and 312. The receivers 311 and 312 separate the channels 11 and 12, respectively, and frequency-convert the channels into signals having an IF band. The IF signals are demodulated by the 16 QAM demodulators 411 and 412. A horizontal polarization side of the receiving antenna 102 is connected to the receivers 331 and 332. The receivers 331 and 332 separate the channels 31 and 32, respectively, and frequency-convert the channels into signals having an IF band The IF signals are demodulated by the 16 QAM demodulators 431 and 432.

In the interleave frequency arrangement shown in FIG. 2, the vertically polarized channels 11 and 12 and the horizontally polarized channels 31 and 32 are alternately arranged on a frequency axis. Since polarized wave discrimination is possible between two adjacent channels, channel interference can be sufficiently reduced even if the bands of the two channels more or less overlap each other. Therefore, the bandwidth of the channels is set such that the bands of the channels slightly overlap each other.

FIG. 3 is a block diagram of an arrangement of a dual polarization transmission system which has been used to further improve a frequency band utilizing efficiency in recent years and in which channels having the same center frequency are arranged on two orthogonal polarized waves. FIG. 4 shows a frequency arrangement in the system of FIG. 3. In FIGS. 3 and 4, the same reference numerals as in FIGS. 1 and 2 denote the same parts.

In the conventional example in FIG. 3, vertically polarized channels 51 and 52 and horizontally polarized channels 61 and 62 are added to the interleave frequency arrangement shown in FIG. 2 such that center frequencies of the channels 51, 52, 61, and 62 coincide with the center frequencies f2, f4, f1, and f3 of the channels 31, 32, 11, and 12, respectively.

In FIG. 3, in order to add the vertically polarized channels 51 and 52 having the bandwidth B1 and the center frequencies f2 and f4, respectively, shown in FIG. 4, to the system shown in FIG. 1, 16 QAM modulators 151 and 152 and transmitters 251 and 252 are additionally connected to the vertically polarization side of the transmitting antenna 101, respectively. In addition, in order to receive and demodulate the channels 51 and 52, receivers 351 and 352 and 16 QAM demodulators 451 and 452 are connected to the vertically polarization side of the receiving antenna 102. In order to add the horizontally polarized channels 61 and 62 having the bandwidth B1 and the center frequencies f1 and f3, 16 QAM modulators 161 and 162 and transmitters 261 and 262, and receivers 362 and 363 and 16 QAM demodulators 462 and 463 are connected to the horizontally polarization sides of the transmitting and receiving antennas 101 and 102, respectively.

Since the bandwidth of all the channels is the same, portions (hatched portions in FIG. 4) in which the bands overlap each other are produced between adjacent channels having the same polarized wave, thereby increasing channel interference. Therefore, the bandwidth of each channel must be narrowed.

In order to narrow the bandwidth of each channel, a roll-off coefficient is reduced to strictly limit the bandwidth, or a code transmission rate is reduced.

Data to be transmitted by each channel is composite data obtained by multiplexing main data which is information to be transmitted, subdata such as a digital service channel, and overhead bits for monitoring and controlling a radio section such as a frame sync bit and a parity check bit. By increasing or reducing the number of the subdata or the overhead bits, the code transmission rate can be increased or reduced to some extent even at the same information transmission rate.

As described above, according to the conventional dual polarization transmission system, the bandwidth of each channel must narrowed. However, if the bandwidth is strictly limited for this purpose, a transmission quality is degraded due to nonlinearity, and no system gain can be obtained. In addition, it is difficult to realize a filter system, and degradation in hardware tends to occur. Meanwhile, when the code transmission rate is reduced to narrow the bandwidth, a transmission capacity of the subdata is reduced to limit applications of the system, or a capacity of the overhead bits is reduced to disable high-grade monitoring or control of lines. Furthermore, when the bandwidth of existing channels in the interleave frequency arrangement is narrowed in order to additionally provide new channels, modification of equipment costs a great deal.

SUMMARY OF THE INVENTION

It is, therefore, an object of the present invention to provide a dual polarization transmission system in which channels in an interleave frequency arrangement can be directly used without narrowing their bandwidth and channel interference can be sufficiently reduced.

A dual polarization transmission system of the present invention comprises a first channel having a first polarized wave and a first bandwidth and a second channel having the first polarized wave and a second bandwidth different from the first bandwidth, the first and second channels being arranged alternately, a third channel having a second polarized wave orthogonal to the first polarized wave, a center frequency equal to a center frequency of the second channel, and a bandwidth equal to the first bandwidth, and a fourth channel having the second polarized wave, a center frequency equal to a center frequency of the first channel, and a bandwidth equal to the second bandwidth.

BRIEF DESCRIPTION OF THE DRAWINGS

FIG. 6 is a view for explaining a frequency arrangement for explaining an operation of the system in FIG. 5.

DETAILED DESCRIPTION OF THE PREFERRED EMBODIMENT

An embodiment of the present invention will be described in detail below with reference to the accompanying drawings.

Figure 1:
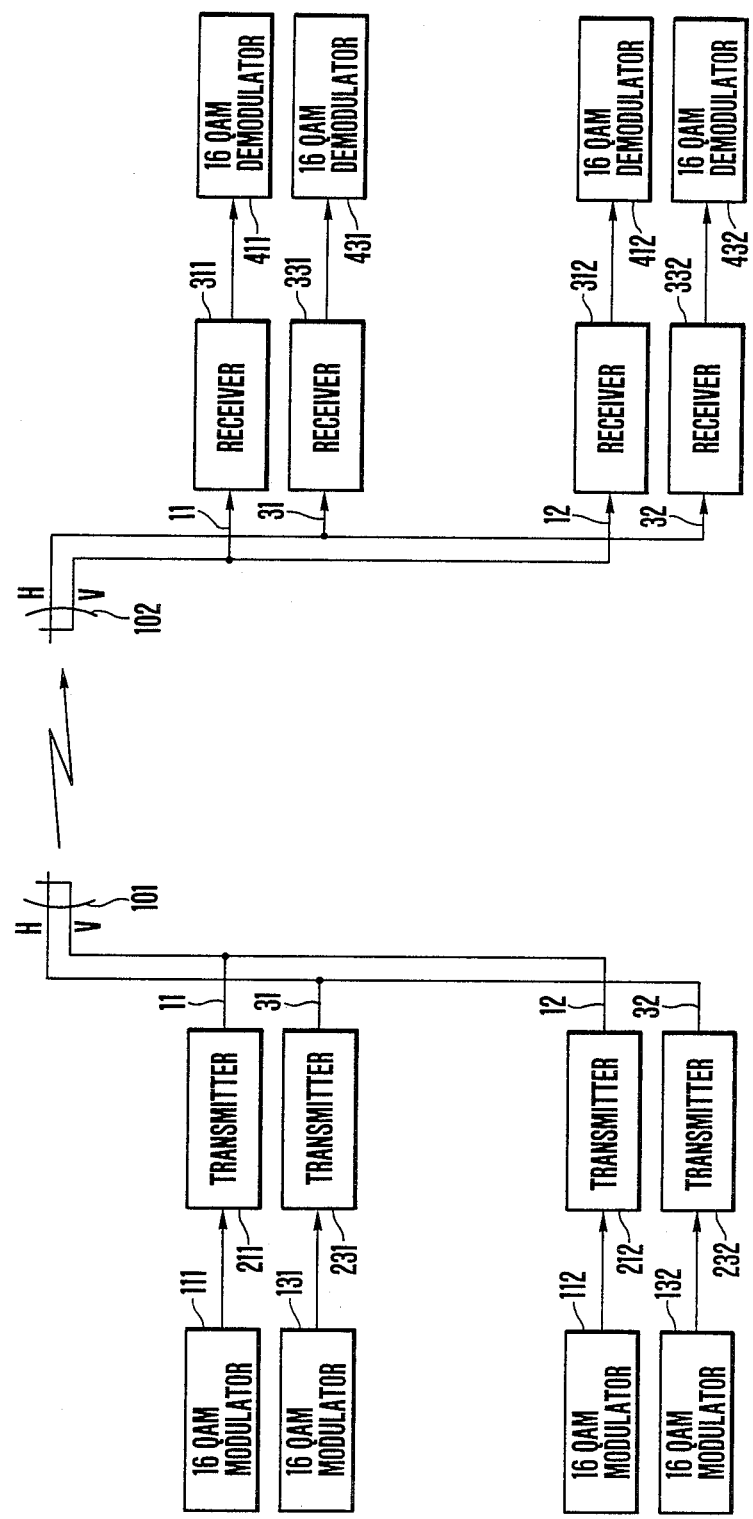
FIG. 1 is a block diagram of an arrangement of a conventional technique.
Figure 2:
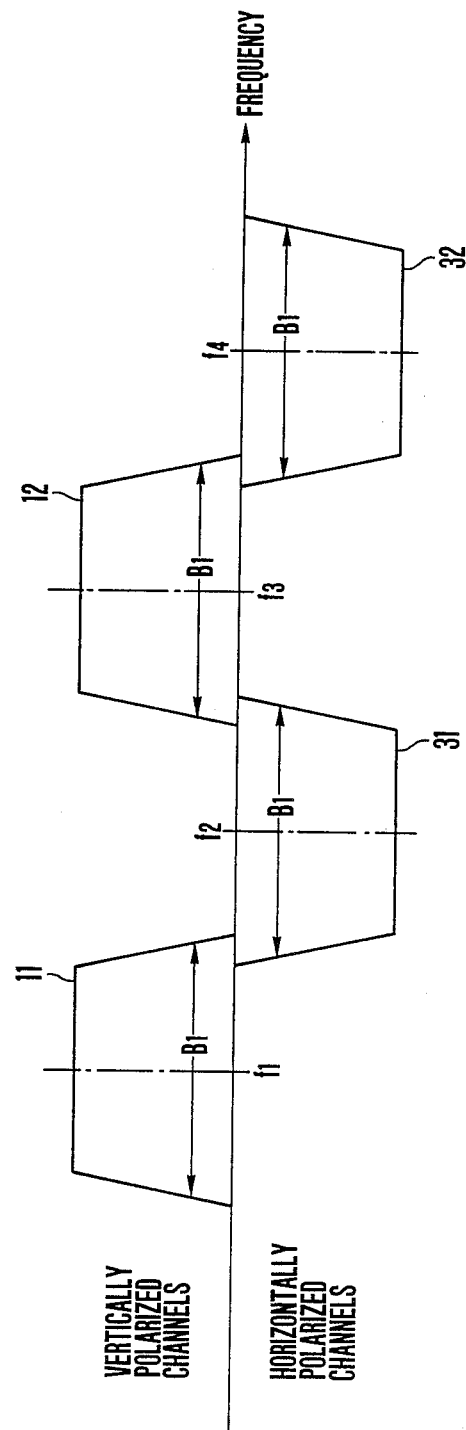
FIG. 2 is a view for explaining a frequency arrangement in the system of FIG. 1.
Figure 3:
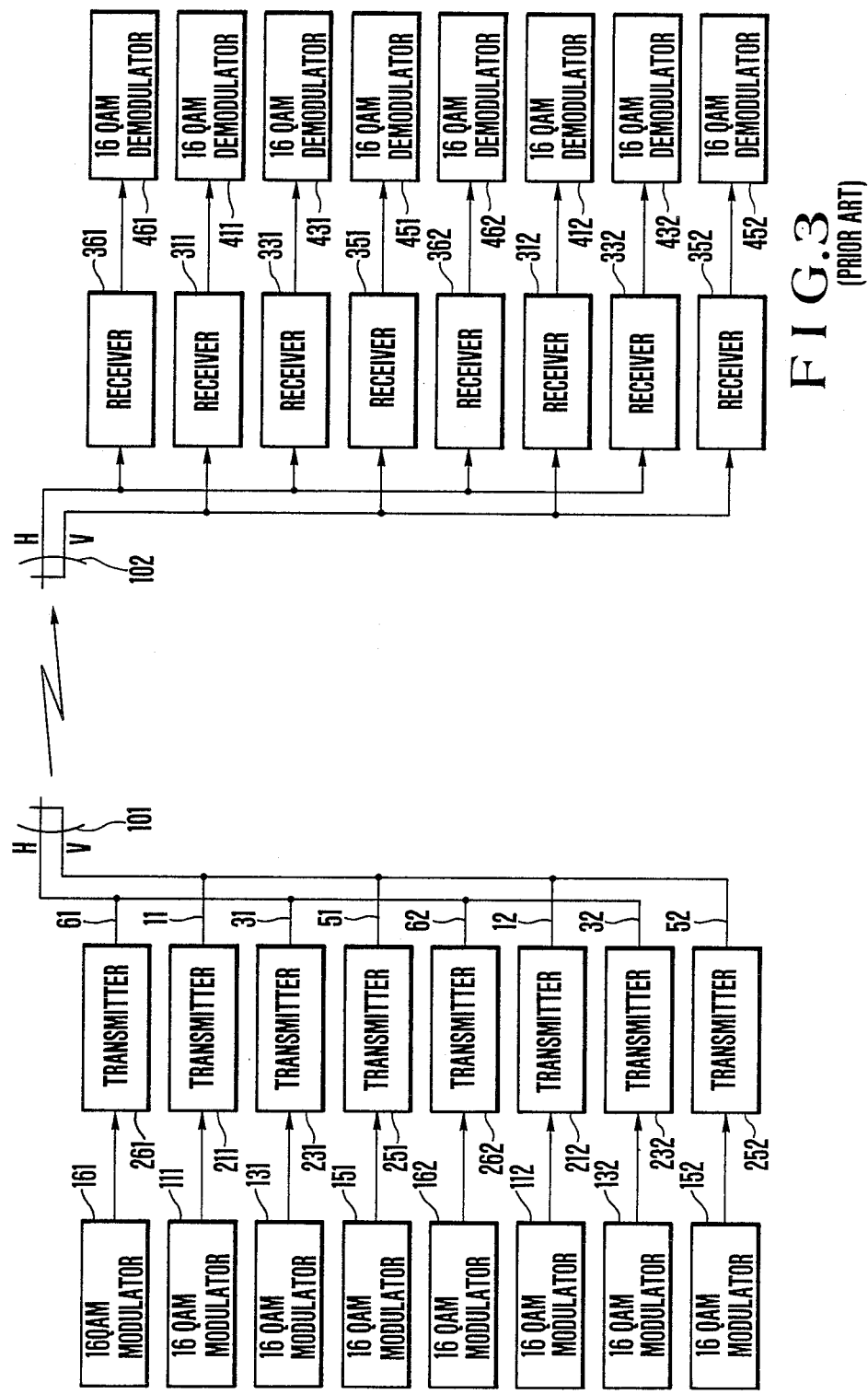
FIG. 3 is a block diagram of an arrangement of another conventional technique.
Figure 4:
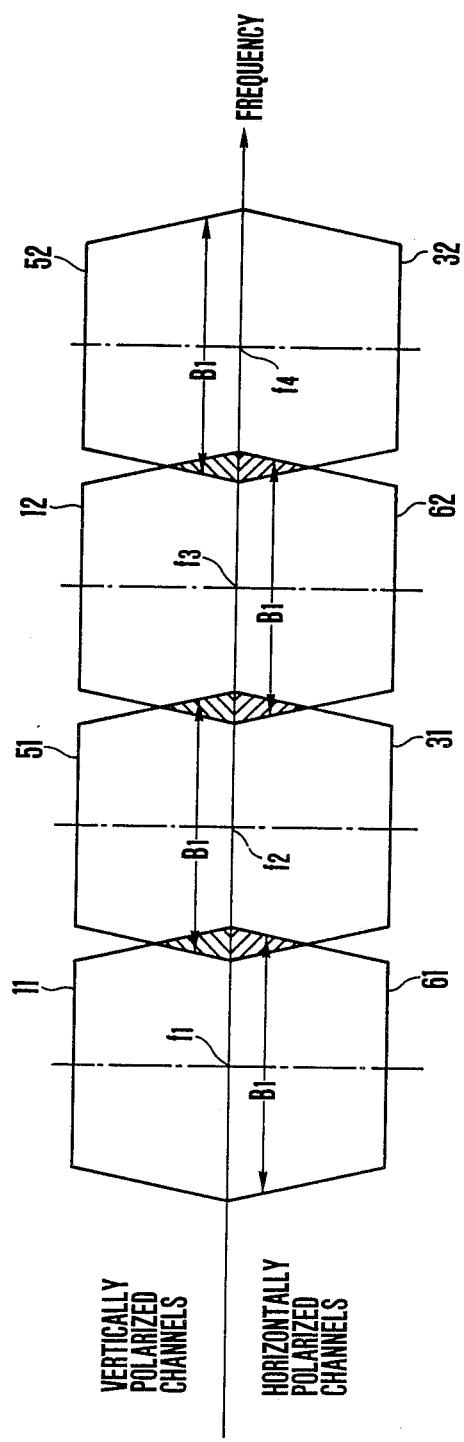
FIG. 4 is a view for explaining a frequency arrangement in the system of FIG. 3.
Figure 5:
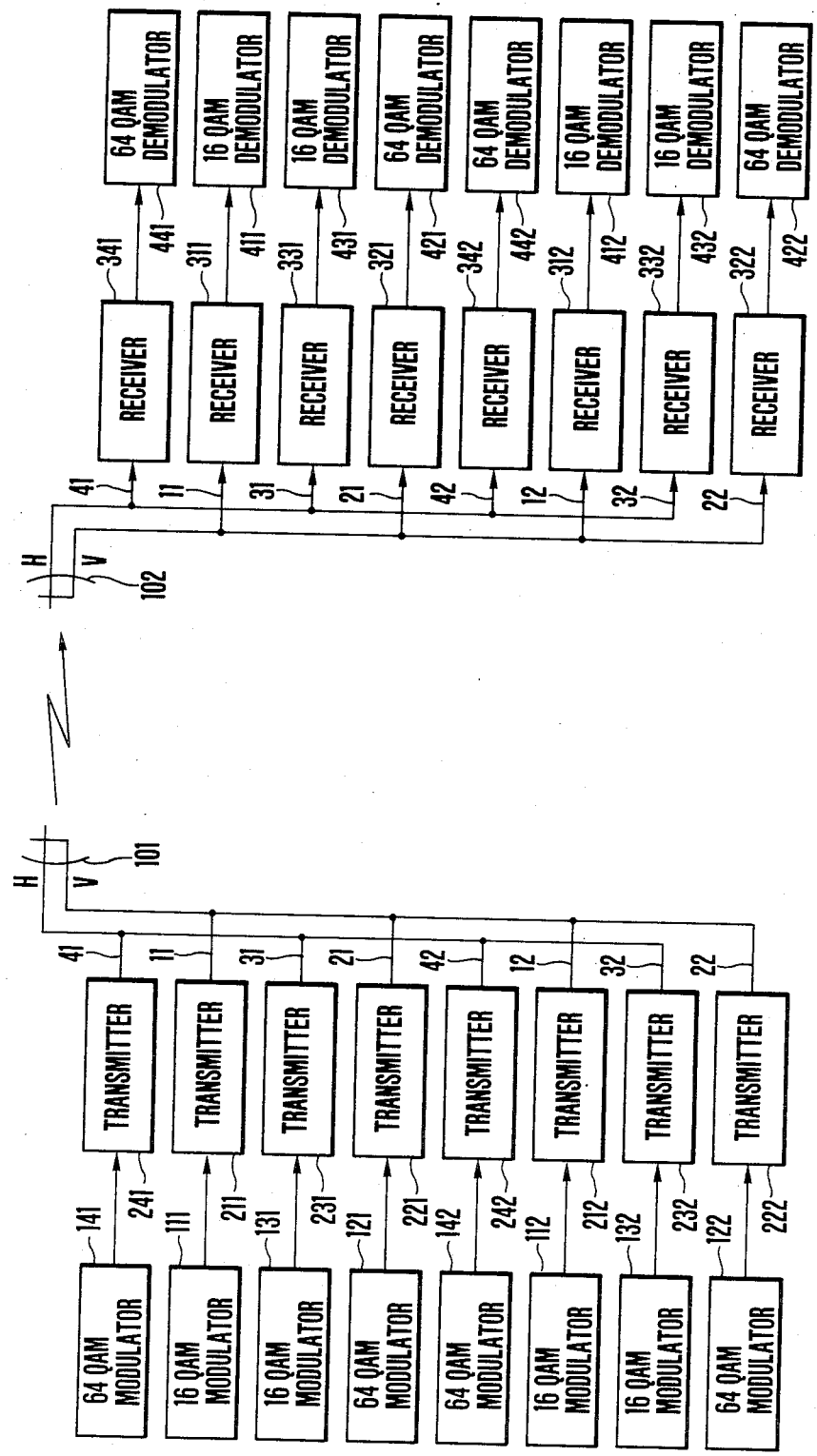
FIG. 5 is a block diagram of an arrangement of an embodiment of a dual polarization transmission system according to the present invention.

FIG. 5 is a block diagram of an arrangement of an embodiment of a dual polarization transmission system according to the present invention.

FIG. 6 is a view showing a frequency arrangement in the system of FIG. 5.

In FIGS. 5 and 6, the same reference numerals as in FIGS. 1 to 4 denote the same parts.

In FIG. 5, a 64 QAM system is additionally provided to an existing 16 QAM system.

A transmitter side is constituted by 16 QAM modulators 111, 112, 131, and 132 for outputting 16 QAM modulated signals (IF signals) having a bandwidth B1, transmitters 211, 212, 231, and 232 for converting the 16 QAM modulated signals into signals of radio frequencies having center frequencies f1, f3, f2, and f4, respectively, and outputting the obtained signals, 64 QAM modulators 121, 122, 141, and 142 for outputting 64 QAM modulated signals (IF signals) having a bandwidth B2, transmitters 221, 222, 241, and 242 for converting the 64 QAM modulated signals into signals of radio frequencies having the center frequencies f1, f2, f3, and f4, respectively, and outputting the obtained signals, and a transmitting antenna 101.

Outputs from the transmitters 211, 212, 221, and 222 are connected to a vertical polarization side of the transmitting antenna 101. The outputs from the transmitters 211 and 212 are transmitted as vertically polarized channels 11 and 12 having the bandwidth B1 and the center frequencies f1 and f3, respectively. The outputs from the transmitters 221 and 222 are transmitted as vertically polarized channels 21 and 22 having the bandwidth B2 and the center frequencies f2 and f4, respectively. The bandwidth B1 is a conventional bandwidth of channels in the existing interleave frequency arrangement, and the bandwidth B2 is narrowed so that channel interference between channels having the same polarized wave is negligible.

Outputs from the transmitters 231, 232, 241, and 242 are connected to a horizontal polarization side of the transmitting antenna 101. The outputs from the transmitters 231 and 232 are transmitted as horizontally polarized channels 31 and 32 having the bandwidth B1 and the center frequencies f2 and f4, respectively. The outputs from the transmitters 241 and 242 are transmitted as horizontally polarized channels 41 and 42 having the bandwidth B2 and the center frequencies f1 and f2, respectively. As a result, a frequency arrangement shown in FIG. 6 is realized.

As shown in FIG. 6, the vertically polarized channels 11 and 12 having the bandwidth B1 and the vertically polarized channels 21 and 22 having the bandwidth B2 are alternately arranged on a frequency axis. The center frequencies of the horizontally polarized channels 31 and 32 having the bandwidth B1 equal to the center frequencies f2 and f4, respectively, of the channels 21 and 22. The center frequencies of the horizontally polarized channels 41 and 42 equal to the center frequencies f1 and f3, respectively, of the channels 11 and 12.

The bandwidth B1 is set to be a conventional bandwidth of channels in the interleave frequency arrangement, and the bandwidth B2 is set to be narrower than the bandwidth B1 so that channel interference between channels having the same polarized wave is negligible.

In FIG. 5, a receiving side is constituted by receivers 311, 312, 331, 332, 341, 342, 321, and 322, 16 QAM demodulators 411, 412, 431, and 432, and 64 QAM demodulators 441, 442, 421, and 422. A vertical polarization side of a receiving antenna 102 is connected to the receivers 311, 312, 321, and 322. The receivers 311, 312, 321, and 322 branch the channels 11, 12, 21, and 22, respectively, and frequency-convert the channels into signals having an IF band. Outputs from the receivers 311, 312, 321, and 322 are demodulated by the 16 QAM demodulators 411 and 412 and the 64 QAM demodulators 421 and 422, respectively. A horizontal polarization side of the receiving antenna 102 is connected to the receivers 331, 332, 341, and 342. The receivers 331, 332, 341, and 342 separate the channels 31, 32, 41, and 42, respectively, and frequency-convert the channels into signals having an IF band. Outputs from the receivers 331, 332, 341, and 342 are demodulated by the 16 QAM demodulators 431 and 432 and the 64 QAM demodulators 441 and 442, respectively.

The channels 11, 12, 31, and 32 can be used in the same manner as channels in the interleave frequency arrangement. In addition, since the bandwidth B2 of the channels 21, 22, 41, and 42 is set narrower than the conventional bandwidth B1 of channels in the interleave frequency arrangement, channel interference can be sufficiently reduced.

Even if the number of channels in a system is increased, a necessary transmission capacity of subdata of the entire system is not often changed. Therefore, by transmitting the subdata only through channels having the bandwidth B1, the bandwidth B2 of the other channels can be set smaller than the bandwidth B without strictly limiting the bandwidth of the channels or reducing the information transmission rate.

As in the above embodiment, when the channels 11, 12, 31, and 32 are provided using the 16 QAMs and the channels 21, 22, 41, and 42 are provided using the 64 QAMs, the bandwidth B2 can be set smaller than the bandwidth B1 while a capacity of composite data remains the same as in the existing channels.

As has been described above, according to the dual polarization transmission system of the present invention, channels having a wide bandwidth and those having a narrow bandwidth are simultaneously used. Therefore, even if the channels having the wide bandwidth are used in the same manner as conventional channels in the interleave frequency arrangement, channel interference can be sufficiently reduced. As a result, when channels are additionally provided to an existing digital radio communication system in the interleave frequency arrangement in order to realize a dual polarization transmission system, existing channels can be directly used without any modification, resulting in an economical advantage. In addition, only channels having the wide bandwidth may be used to increase a transmission capacity of subdata at the start of system use, and when the channels having the wide bandwidth are used up by additionally providing channels, those having the narrow bandwidth may be used. In this case, the frequency band can be effectively used from the start of system use to widen the application range of the system.

What is claimed is:

1. A dual polarization transmission system comprising:
   a first channel having a first polarized wave and a first bandwidth and a second channel having the first polarized wave and a second bandwidth different from the first bandwidth, said first and second channels being arranged alternately;
   a third channel having a second polarized wave orthogonal to the first polarized wave, a center frequency equal to a center frequency of said second channel, and a bandwidth equal to the first bandwidth; and
   a fourth channel having the second polarized wave, a center frequency equal to a center frequency of said first channel, and a bandwidth equal to the second bandwidth.

2. A system according to claim 1, wherein the second bandwidth is set to be smaller than the first bandwidth so that interference between adjacent channels having the same polarized wave is negligible.

3. A system according to claim 1, wherein a frequency arrangement is determined in accordance with the radio frequencies set at equal intervals and the first and second bandwidths are set such that adjacent channels having the same polarized wave do not interfere with each other.

4. A dual polarization transmission system comprising:
   producing means for producing a first channel group consisting of a plurality of channels having a first polarized wave, a first bandwidth, and different center frequencies assigned at predetermined frequency intervals;
   producing means for producing a second channel group consisting of a plurality of channels having the first polarized wave, a second bandwidth which can be set between adjacent channels of the first channel group and is smaller than the first bandwidth, and center frequencies positioned in the middle of the center frequencies of adjacent channels of said first channel group;
   producing means for producing a third channel group consisting of a plurality of channels having a second polarized wave, the first bandwidth and center frequencies equal to the center frequencies of the channels of said second channel group;
   producing means for producing a fourth channel group consisting of a plurality of channels having the second polarized wave, the second bandwidth, and center frequencies equal to the center frequencies of the channels of said first channel group;
   transmitting means for transmitting a signal having a frequency arrangement according to said first, second, third, and fourth channel groups by the first and second polarized waves; and
   recovering means for receiving the signal transmitted from said transmitting means, and separating and recovering the channels of said channel groups.

5. A dual polarization transmission system comprising:
   a transmitter side comprising:
   a plurality of first modulators for outputting first modulated IF signals having a first bandwidth;
   a plurality of first transmitters, connected in correspondence to said plurality of first modulators, for converting outputs from said plurality of first modulators into channel signals having radio frequencies set on a frequency axis at equal intervals as center frequencies;
   a plurality of second modulators for outputting second modulated IF signals having a second bandwidth smaller than the first bandwidth;
   a plurality of second transmitters, connected in correspondence to said plurality of second modulators, for converting outputs from said plurality of second modulators into channel frequencies having the radio frequencies set at equal intervals as center frequencies;
   a transmitting antenna having a first polarization section for performing first polarization and a second polarization section for performing second polarization orthogonal to the first polarization;
   connecting means for alternately connecting outputs from said plurality of first transmitters to said first and second polarization sections of said transmitting antenna in an order of the magnitude of the center frequencies; and
   connecting means for alternately connecting outputs from said plurality of second transmitters to said first and second polarization sections of said transmitting antenna in an order of the magnitude of the center frequencies; and
   a receiving side comprising:
   a receiving antenna having first and second polarization sections for performing the first and second polarization, respectively;
   a plurality of receivers, each corresponding to said plurality of transmitters and connected to said first or second polarization section of said receiving antenna, for converting a received channel into a corresponding IF signal; and
   a plurality of demodulators for demodulating output signals from said plurality of receivers.

6. A system according to claim 5, wherein a frequency arrangement is determined in accordance with the radio frequencies set at equal intervals and the first and second bandwidths are set such that adjacent channels having the same polarized wave do not interfere with each other.

7. A system according to claim 5, wherein each of said first modulators is a 16 QAM modulator and each of said second modulators is a 64 QAM modulator.

* * * * *

UNITED STATES PATENT AND TRADEMARK OFFICE
CERTIFICATE OF CORRECTION

PATENT NO. : 4,811,021
DATED : March 7, 1989
INVENTOR(S) : Makoto Yoshimoto et al.

It is certified that error appears in the above-identified patent and that said Letters Patent is hereby corrected as shown below:

Column 1, line 51, after "band" insert --.--.

Column 4, line 66, delete "B" and insert --B1--.

Signed and Sealed this

Twelfth Day of December, 1989

Attest:

JEFFREY M. SAMUELS

*Attesting Officer*    Acting Commissioner of Patents and Trademarks